United States Patent
Hammann et al.

[11] 3,928,408
[45] Dec. 23, 1975

[54] ISOCYANO-DIPHENYL ETHERS

[75] Inventors: Ingeborg Hammann, Cologne; Peter Hoffmann, Leverkusen; Dieter Marquarding, Odenthal-Globusch; Ivar Ugi, Grunwald; Gunter Unterstenhöfer, Opladen, all of Germany

[73] Assignee: Bayer Aktiengesellschaft, Leverkusen, Germany

[22] Filed: May 10, 1973

[21] Appl. No.: 359,165

[30] Foreign Application Priority Data
May 27, 1972 Germany............................ 2225873

[52] U.S. Cl. ..... 260/465 F; 260/465 G; 260/465 R; 260/562 A; 260/562 P; 260/562 R; 424/304
[51] Int. Cl.² ....................................... C07C 119/02
[58] Field of Search ......... 260/465 F, 465 R, 465 G

[56] References Cited
UNITED STATES PATENTS
3,422,190  1/1969  Voi et al. ........................ 260/465 X
3,627,811  12/1971  Hammann et al. ................ 260/465

*Primary Examiner*—Lewis Gotts
*Assistant Examiner*—Dolph H. Torrence
*Attorney, Agent, or Firm*—Burgess, Dinklage & Sprung

[57] ABSTRACT

Substituted isocyano-diphenyl ethers of the formula

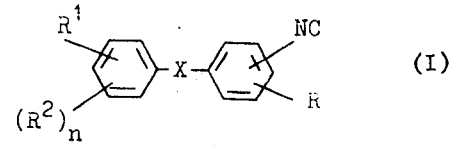

in which
 X is oxygen or sulfur,
 R is hydrogen, halogen, lower alkyl or lower alkoxy,
 R¹ is optionally substituted cycloalkyl, halogen or alkylmercapto,
 R² is hydrogen, halogen or alkyl, and
 n is 1, 2 or 3,
which possess insecticidal, acaricidal, fungicidal and rodent-repellent properties.

7 Claims, No Drawings

ISOCYANO-DIPHENYL ETHERS

The present invention relates to and has for its objects the provision of particular new substituted isocyano-diphenyl ethers which possess insecticidal, acaricidal, fungicidal and rodent-repellent properties, active compositions in the form of mixtures of such compounds with solid and liquid dispersible carrier vehicles, and methods for producing such compounds and for using such compounds in a new way especially for combating pests, e.g. insects, acarids, fungi and rodents, especially insects and acarids, with other and further objects becoming apparent from a study of the within specification and accompanying examples.

German Published Specification DOS 1,768,130 teaches that isocyanodiphenyl thioethers are acaricidally active; however, the activity is not always satisfactory when low concentrations are used.

The present invention provides new isocyanodiphenyl ethers of the general formula

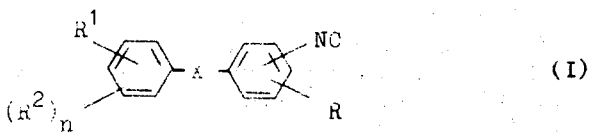

in which
X is oxygen or sulfur,
R is hydrogen, halogen, lower alkyl or lower alkoxy,
$R^1$ is optionally substituted cycloalkyl, halogen or alkylmercapto,
$R^2$ is hydrogen, halogen or alkyl, and
n is 1, 2 or 3.

Preferably, X is oxygen, R is chlorine, or alkyl or alkoxy of up to 4 carbon atoms, especially methyl or methoxy, $R^1$ is cycloalkyl with 5 or 6 carbon atoms, chlorine, bromine, or lower alkylmercapto such as methylmercapto or ethylmercapto, and $R^2$ is hydrogen, chlorine, bromine or lower alkyl such s methyl.

Surprisingly, the isocyanodiphenyl ethers according to the invention show a substantially greater acaricidal and insecticidal action than the known isocyanodiphenyl thioethers, which are the chemically most closely related active compounds of the same type of action. The compounds according to the invention thus represent an enrichment of the art.

The invention also provides a process for the production of an isocyanodiphenyl ether of the general formula (I) in which a formamide of the general formula

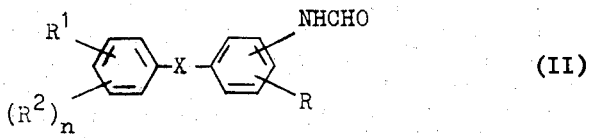

in which
R, $R^1$, $R^2$, X and n have the abovementioned meanings, is reacted with an agent which splits off water, in the presence of a base.

If 4-cyclohexyl-4'-formylamino-diphenyl ether is used as the starting compound, the course of the reaction can be represented by the following formula scheme:

The following may be mentioned as specific examples of N-formylamino-diphenyl ethers which can be used as starting compounds according to the invention; 4-formylamino-4'-chloro-, 2-formylamino-4,4'-dichloro-, 2-formylamino-6,4'-dichloro, 4-formylamino-2,4'-dichloro-, 4-formylamino-4'-chloro-3', 5'-dimethyl-, 2-formylamino-4,4'-dichloro-3', 5'-dimethyl-, 2-formylamino-4'-chloro-4,3', 5'-trimethyl-, 2-formylamino-6,4'-dichloro-3', 5'-dimethyl-, 2-formylamino-4'-chloro-3', 5'-dimethyl-, 4-formylamino-3', 5'-dimethyl-, 2-formylamino-4-chloro-3', 5'-dimethyl-, 2-formylamino-4,3', 5'-trimethyl-, 2-formylamino-4,3', 5'-trimethyl-4'-methylmercapto-, 4-formylamino-3', 5'-dimethyl-4'-methylmercapto-, 4-formylamino-3', 5'-dimethyl-2-chloro-4'-methylmercapto-, 4-formylamino-2-chloro-2'-methyl-4'-methylmercapto-, 4-formylamino-2'-methyl-4'-methylmercapto-, 4-formylamino-3-methoxy-4'-cyclohexyl-, 2-formylamino-4'-cyclohexyl-, 2-formylamino-4-chloro-4'-cyclohexyl-, 2-formylamino-6-chloro- 4'-cyclohexyl-, 4-formylamino-4'-cyclohexyl-, 4-formylamino-2'-chloro-4'-cyclohexyl-, 4-formylamino-2'-methyl-4'-cyclohexyl-, 4-formylamino-2-chloro-4'-cyclohexyl-, 4-formylamino-2', 6'-dichloro-4'-cyclohexyl-, 4-formylamino-2', 6'-dimethyl-4'-cyclohexyl-, 4-formylamino-2'-cyclohexyl-, 2-formylamino-2-cyclohexyl- and 4-formylamino-4'-(4-tert.-butylcyclohexyl).

Some of the formamides of formula (II) are known. Those which are new can be prepared in a simple manner from the corresponding known amines.

For example, the amines may be boiled for 1 to 10 hours in formic acid; after concentration, the corresponding formamides are obtained in a crystalline form. Alternatively, it is possible to treat the amines in an inert solvent, such as methylene chloride, for 1 to 10 hours at 0° to 80°C with a mixture of acetic anhydride and formic acid. The formamides thus obtained may be washed with dilute aqueous sodium carbonate solution and dried.

In the preparation of the isocyanodiphenyl ethers it is possible to carry out the reaction in the presence of a diluent, such as a hydrocarbon, for example benzene or benzine, a chlorinated hydrocarbon, for example methylene chloride, an ether, for example dioxane, or an ester, for example acetic acid ethyl ester.

Phosgene is a particularly suitable agent for splitting off water, but it is for example possible to use other acyl chlorides, such as phosphorus oxychloride, benzene sulfonyl chloride or cyanuric chloride. Pyridine, triethylamine or potassium tert.-butylate are examples of the bases. The reaction temperatures are generally −20° to +100°C, preferably −5°C to +90°C.

The isocyano-diphenyl ethers may be obtained in a particularly simple manner if the corresponding formamides together with triethylamine are initially introduced into methylene chloride as the diluent, and phosgene is passed into the resulting mixture.

Working up may take place in the usual manner; for example, ammonia may be passed into the reaction mixture, the ammonium chloride which has separated out being removed and the solution being concentrated.

The compounds according to the invention exhibit fungicidal activity, for example against mildew fungi

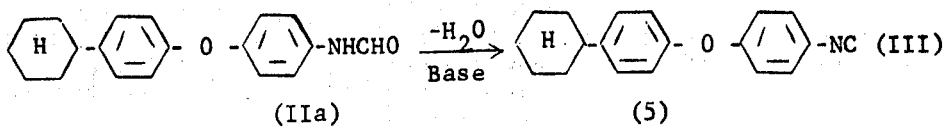

and against seed-borne and soil-borne genuine fungal plant diseases such as, for example, bunt of wheat. The compounds according to the invention can furthermore be employed as rodent repellents.

They are especially active, however, against insects and acarids. To the sucking insects combated there belong, in the main, aphids (Aphidae) such as the green peach aphid (*Myzus persicae*), the bean aphid (*Doralis fabae*) the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (*Coccina*), for example the oleander scale (*Aspidiotus hederae*) and the soft scale (*Lecanium hesperidum*) as well as the grape mealybug (*Pseudococcus maritimus*); thrips (*Thysanoptera*), such as *Hercinothrips femoralis*, and bugs, for example the beet bug (*Piesma quadrata*), the red cotton bug (*Dysdercus intermedius*), the bed bug (*Cimex lecturlarius*), the assassin bug (*Rhodnius prolixus*) and Chagas' bug (*Triatoma infestans*) and, further, cicadas, such as *Euscelis bilobatus* and *Nephotettix bipunctatus*.

In the case of the biting insects, above all there should be mentioned butterfly caterpillars (*Lepidoptera*) such as the diamond-back moth (*Plutella maculipennis*), the gypsy moth (*Lymantria dispar*), the browntail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kuhniella*) and greater wax moth (*Galleria mellonella*).

Also to be classed with the biting insects are beetles (*Coleoptera*), for example the granary weevil (*Sitophilus granarius* = *Calandra granaria*), the colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius* = *Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (*Agriotes* spec.) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) and well as *Henschoutedenia flexivitta*; further, *Orthoptera*, for example the house cricket (*Acheta domesticus*); termites such as the eastern subterranean termite (*Reticulitermes flavipes*) and Hymenoptera such as ants, for example the garden ant (*Lasius niger*).

The *Diptera* comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (*Acari*) there are classed, in particular, the spider mites (*Tetranychidae*) such as the two-spotted spider mite (*Tetranychus urticae*) and the European red mite (*Paratetranychus pilosus* = *Panonychus ulmi*), gall mites, for example the blackcurrent gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*).

When applied against hygiene pests and pests of stored products, particularly flies and mosquitoes, the process products are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alimina, silica, chalk, i.e. calcium carbonate, talc, attapulgite, montmorillonite kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides, fungicides and rodent-repellents, or bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.001–95%, and preferably 0.01–95%, by weight of the mixture.

The active compounds can also be used in accordance with the well known ultra-low-volume process with good success, i.g. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids, fungi and rodents, and more particularly methods of combating at least one of insects and acarids, which comprises applying to at least one of correspondingly (a) such insects, (b) such acarids, (c) such fungi, (d) such rodents, and (e) the corresponding habitat thereof, i.e. the locus to be protected, a correspondingly combative or toxic amount, i.e. an insecticidally, acaricidally, fungicidally or rodent-repellent effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dressing, encrustation, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Laphygma test

Solvent: 3 parts by weight of dimethylformamide
Emulsifier: 1 part by weight of alkylaryl polyglycol ether To produce a suitable preparation of active compound, 1 part by weight of active compound was mixed with the stated amount of solvent containing the stated amount of emulsifier and the concentrate was diluted with water to the desired concentration.

Cotton leaves (*Gossypium barbadense*) were sprayed with the preparation of the active compound until dew moist and were infested with caterpillars of the small mottled willow moth (*Laphygma exigua*).

After the indicated periods of time, the degree of destruction in % was determined. 100% denotes that all caterpillars were killed while 0% indicates that no caterpillars were killed.

The active compounds, the concentrations of the active compounds, the evaluation times and the results can be seen from the following Table 1.

Table 1

Laphygma test

| Active compounds | Active compound concentration in % by weight | Degree of destruction in % after 3 days |
|---|---|---|
| 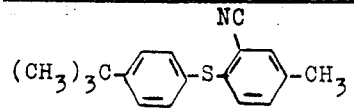 (known) (A) | 0.1 | 0 |

Table 1 (continued)

Laphygma test

| Active compounds | Active compound concentration in % by weight | Degree of destruction in % after 3 days |
|---|---|---|
| 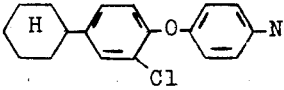 (2) | 0.1<br>0.01 | 100<br>50 |
| 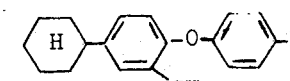 (1) | 0.1<br>0.01 | 100<br>85 |
| 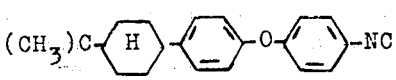 (9) | 0.1 | 100 |

EXAMPLE 2

Myzus test (contact action)

Solvent: 3 parts by weight of dimethylformamide
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage plants (*Brassica oleracea*) which had been heavily infested with peach aphids (*Myzus persicae*) were sprayed with the preparation of the active compound until dripping wet.

After the specified periods of time, the degree of destruction was determined as a percentage: 100% means that all the aphids were killed whereas 0% means that none of the aphids were killed.

The active compounds, the concentrations of the active compounds, the evaluation times and the results can be seen from the following Table 2.

Table 2

Myzus test

| Active compounds | Active compound concentration in % by weight | Degree of destruction in % after 1 day |
|---|---|---|
| 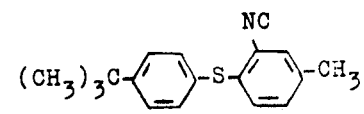<br>(known) (A) | 0.1 | 0 |
| 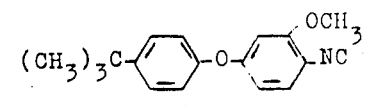<br>(known) (B) | 0.1 | 0 |

Table 2—Continued

Myzus test

| Active compounds | Active compound concentration in % by weight | Degree of destruction in % after 1 day |
|---|---|---|
| 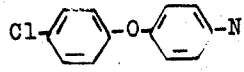 (8) | 0.1 | 95 |
| 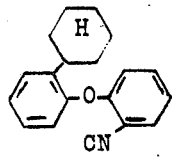 (10) | 0.1 | 90 |
| 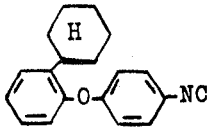 (7) | 0.1 | 90 |

EXAMPLE 3

*Tetranychus urticae* test (normal sensitivity)
Solvent: 3 parts by weight of dimethylformamide
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Bean plants (*Phaseolus vulgaris*) which had a height of approximately 10 – 30 cm, were sprayed with the preparation of the active compound until dripping wet. These bean plants were heavily infested with the two-spotted spider mite (*Tetranychus urticae*) in all stages of development.

After the specified periods of time, the effectiveness of the preparation of active compound was determined by counting the dead insects. The degree of destruction thus obtained was expressed in %. 100% denotes that all spider mites were killed and 0% denotes that none of the spider mites were killed.

The active compounds, the concentrations of the active compounds, the evaluation times and the results can be seen from the following Table 3.

Table 3

*Tetranychus urticae* (normal sensitivity)

| Active compounds | Active compound concentration in % by weight | Degree of destruction in % after 8 days |
|---|---|---|
| 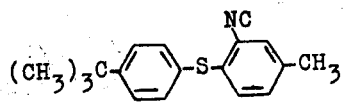 (known) (A) | 0.02<br>0.004<br>0.002 | 100<br>75<br>50 |
| 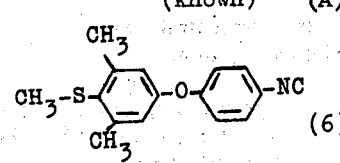 (6) | 0.02<br>0.004<br>0.002 | 100<br>100<br>95 |
| 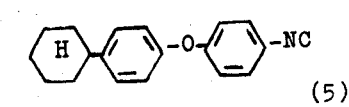 (5) | 0.2<br>0.004<br>0.002 | 100<br>100<br>88 |

Table 3—Continued

Tetranychus urticae (normal sensitivity)

| Active compounds | Active compound concentration in % by weight | Degree of destruction in % after 8 days |
|---|---|---|
|  (1) | 0.02<br>0.004<br>0.002 | 100<br>98<br>75 |
| 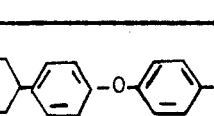 (4) | 0.02<br>0.004<br>0.002 | 100<br>98<br>50 |

EXAMPLE 4

*Tetranychus test* (resistant to phosphoric acid esters)

Solvent: 3 parts by weight of dimethylformamide
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Bean plants (*Phaseolus vulgaris*) which had a height of approximately 10 – 30 cm, were sprayed with the preparation of the active compound until dripping wet. These bean plants were heavily infested with the two-spotted spider mite (*Tetranychus urticae*) in all stages of development.

After the specified periods of time, the effectiveness of the preparation of active compound was determined by counting the dead insects. The degree of destruction thus obtained was expressed in %. 100% denotes that all spider mites were killed and 0% denotes that none of the spider mites were killed.

The active compounds, the concentrations of the active compounds, the evaluation times and the results can be seen from the following Table 4.

Table 4

Tetranychus test (resistant to phosphoric acid esters)

| Active compounds | Active compound concentration in % by weight | Degree of destruction in % after 2 days |
|---|---|---|
| 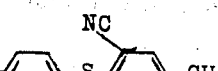 (known) (A) | 0.002<br>0.0002 | 100<br>0 |
| 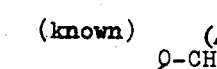 (known) (B) | 0.002<br>0.0002 | 95<br>0 |
| 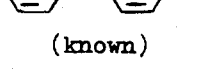 (5) | 0.002<br>0.0002 | 100<br>75 |

EXAMPLE 5

*Tetranychus urticae* (carbamate-resistant)

Solvent: 3 parts by weight of dimethylformamide
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Bean plants (*Phaseolus vulgaris*) which had a height of approximately 10 – 30 cm, were sprayed with the preparation of the active compound until dripping wet. These bean plants were heavily infested with the two-spotted spider mite (*Tetranychus urticae*) in all stages of development.

After the specified periods of time, the effectiveness of the preparation of active compound was determined by counting the dead insects The degree of destruction thus obtained was expressed in %. 100% denotes that all spider mites were killed and 0% denotes that none of the spider mites were killed.

The active compounds, the concentrations of the active compounds, the evaluation times and the results can be seen from the following Table 5.

Emulsifier: 1 part by weight of alkylaryl polyglycol ether

To produce a suitable preparation of active compound, 1 part by weight of the active compound was mixed with the stated amount of solvent containing the stated amount of emulsifier and the concentrate was diluted with water to the desired concentration.

Bean plants (*Phaseolus vulgaris*) which had a height of approximately 10–30 cm, were sprayed with the preparation of the active compound until dripping wet. These bean plants were heavily infested with the spider mite (*Tetranychus telarius*) in all stages of development.

After the specified periods of time, the effectiveness of the preparation of active compound was determined by counting the dead animals. The degree of destruction thus obtained was expressed in %. 100% denotes that all spider mites were killed and 0% denotes that Table 5

Tetranychus urticae (carbamate-resistant)

| Active compounds | Active compound concentration in % by weight | Degree of destruction in % after 8 days |
|---|---|---|
| 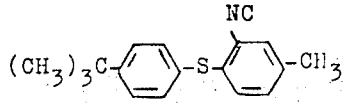 (known) (A) | 0.02<br>0.004<br>0.002 | 100<br>50<br>0 |
| 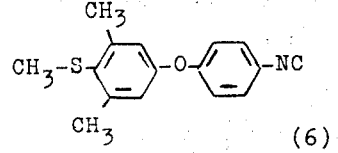 (6) | 0.02<br>0.004<br>0.002 | 100<br>98<br>70 |
| 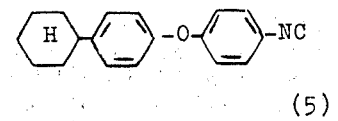 (5) | 0.02<br>0.004<br>0.002 | 100<br>100<br>98 |
| 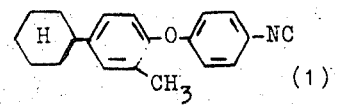 (1) | 0.02<br>0.004<br>0.002 | 100<br>98<br>80 |
| 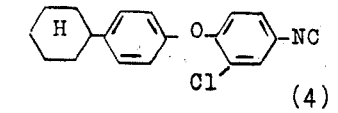 (4) | 0.02<br>0.004<br>0.002 | 100<br>98<br>95 |

EXAMPLE 6

*Tetranychus telarius* test (resistant)

Solvent: 3 parts by weight of dimethylformamide none of the spider mites were killed.

The active compounds, the concentrations of the active compounds, the evaluation times and the results can be seen from the following Table 6.

Table 6

Tetranychus telarius (resistant)

| Active compounds | Active compound concentration in % by weight | Degree of destruction in % after 8 days |
|---|---|---|
| 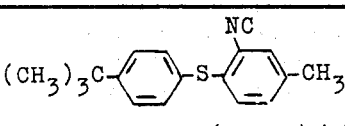 (known) (A) | 0.02<br>0.004<br>0.002 | 100<br>60<br>30 |
| 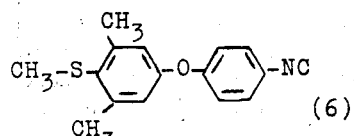 (6) | 0.02<br>0.004<br>0.002 | 100<br>95<br>70 |
| 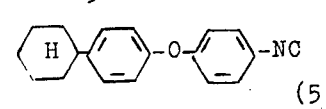 (5) | 0.02<br>0.004<br>0.002 | 100<br>100<br>98 |
| 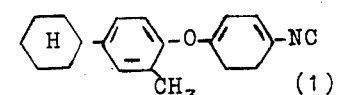 (1) | 0.02<br>0.004<br>0.002 | 100<br>98<br>95 |
| 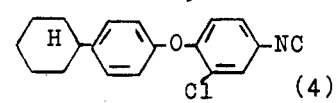 (4) | 0.02<br>0.004<br>0.002 | 100<br>95<br>60 |

The following examples illustrate the synthesis of the compounds.

EXAMPLE 7

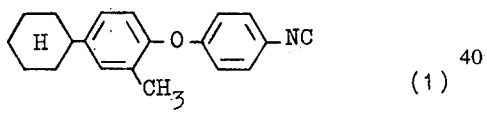

(1)

4'-Isocyano-4-cyclohexyl-2-methyl-diphenyl ether 40.5 g of 4'-formylamino-4-cyclohexyl-2-methyl-diphenyl ether were taken up in a mixture of 300 ml of ethylene chloride and 44 ml of triethylamine; after 13.1 g of phosgene had been introduced at $-10°$ to $-5°C$, the mixture was repeatedly washed with a saturated sodium bicarbonate solution and the organic phase was dried with sodium sulfate and concentrated in vacuo. The residue was triturated with ice-cold methanol.

Yield: 27.5 g (72.5% of theory), melting point 76°–77° (from petroleum ether).

EXAMPLE 8

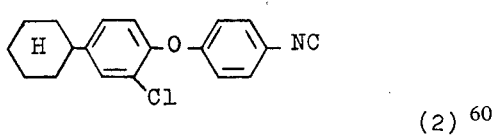

(2)

4'-Isocyano-4-cyclohexyl-2-chloro-diphenyl ether 20 g of 4'-formylamino-4-cyclohexyl-2-chloro-diphenyl ether were dissolved in 200 ml of ethylene chloride and 21 ml of triethylamine. 6.1 g of phosgene were introduced at $-10°$ to $5°C$, with vigorous stirring. After warming to room temperature, the mixture was repeatedly extracted by shaking with saturated sodium bicarbonate solution, dried with potassium carbonate and concentrated in vacuo, during which process the bath temperature was not allowed to exceed 35°C. The residue was well stirred with methanol and then filtered off.

Yield: 10.4 g (55% of theory), melting point 94°–96°.

EXAMPLE 9

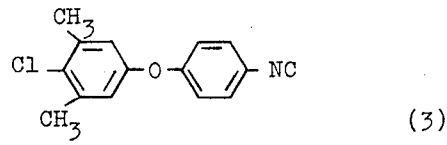

(3)

4'-Isocyano-4-chloro-3,5-dimethyl-diphenyl ether 30 g of phosgene were rapidly passed into a solution of 82.6 g of 4'-formylamino-4-chloro-3,5-dimethyl-diphenyl ether in 500 ml of ethylene chloride and 96 ml of triethylamine at $-5°C$. After 30 minutes, the mixture was repeatedly extracted by shaking with saturated sodium bicarbonate solution, dried over sodium sulfate and concentrated in vacuo. The solid residue was stirred with methanol at 0°C and then filtered off.

Yield: 53 g (69% of theory), melting point 61°–62°.

EXAMPLE 10

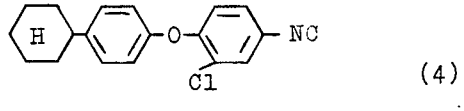

(4)

4'-Cyclohexyl-4-isocyano-2-chloro-diphenyl ether 98.5 g of 4'-cyclohexyl-4-formylamino-2-chloro-diphenyl ether were dissolved in 250 ml of ethylene chloride and 105 ml of triethylamine. 34.5 g of phosgene were passed in at 0°–10°C, while stirring. After 30 minutes, gaseous ammonia was passed in at 5°C until saturation was reached. The precipitate was filtered off and well washed with ethylene chloride and the filtrate was concentrated in vacuo.

EXAMPLE 11

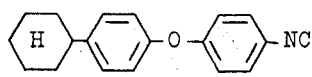 (5)

4'-Isocyano-4-cyclohexyl-diphenyl ether 1,180 g of 4'-formylamino-4-cyclohexyl-diphenyl ether were dissolved in 4,500 ml of ethylene chloride and 1,300 ml of triethylamine and 420 g of phosgene were passed in over the course of 30 minutes at 0°–5°C. The temperature was allowed to rise to 15°–20°C over the course of 30 minutes and the mixture was saturated with gaseous ammonia and washed with a large amount of water at 10°C. The organic phase was dried with sodium sulfate and concentrated in vacuo at 35°C bath temperature. The volatile constituents were removed from the oily residue in a high vacuum over a period of 15 minutes and the oil crystallized throughout. The solid residue was well stirred with 800 ml of ethanol, cooled to 0°C, filtered off and washed with 200 ml of cold ethanol.

Yield: 770 g (70% of theory), melting point 79°–81° (from petroleum ether).

EXAMPLE 12

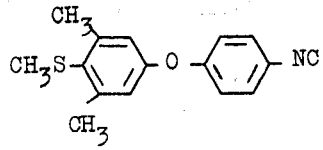 (6)

4'-Isocyano-4-methylmercapto-3,5-dimethyl-diphenyl ether 287 g of 4'-formylamino-4-methylmercapto-3,5-dimethyl-diphenyl ether were suspended in 1,000 ml of methylene chloride and 350 ml of triethylamine and 110 g of phosgene were introduced at 20°C while stirring. The reaction mixture was subsequently washed with saturated sodium bicarbonate solution, the organic phase was dried with sodium sulfate and concentrated in vacuo, and the oily residue was triturated with 200 ml of methanol. The crystals were filtered off.

Yield: 200 g (74% of theory), melting point 61°–63°C.

EXAMPLE 13

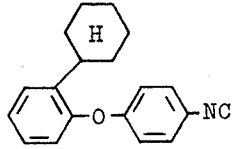 (7)

4'-Isocyano-2-cyclohexyl-diphenyl ether 31.5 g of phosgene were passed into a solution of 88.2 g of 4'-formylamino-2-cyclohexyl-diphenyl ether in 500 ml of methylene chloride and 105 ml of triethylamine at 0°–5°C over the course of 30 minutes. The mixture was stirred for a further 30 minutes and was then extracted by shaking with saturated sodium bicarbonate solution. The organic phase was dried with sodium sulfate and concentrated in vacuo at 30°C bath temperature. The residue was dissolved in benzene and filtered over silica gel. The filtrate was concentrated in vacuo.

Yield: 75 g (90.5% of theory) of an oil.
$C_{19}H_{19}NO$ (277) calculated C 82.3 H 6.9 N 5.0.
found C 82.0 H 7.4 N 4.9

Yield: 75 g (80.5% of theory), melting point 78°–80° (from isopropanol).

EXAMPLE 14

 (8)

4'-Chloro-4-isocyano-diphenyl ether 30 g of phosgene were passed into a solution of 74.3 g of 4'-chloro-4-formylamino-diphenyl ether in 300 ml of ethylene chloride and 105 ml of triethylamine, while stirring, at −5°C to +5°C. The temperature was then allowed to rise to 15°C and the reaction mixture was washed repeatedly with saturated sodium bicarbonate solution. The organic phase was dried with sodium sulfate and concentrated in vacuo at 30°C bath temperature. The crystalline residue was stirred with 95% strength methanol, cooled to 0°C and filtered off.

Yield: 40 g (58% of theory), melting point 62°–64°C.

EXAMPLE 15

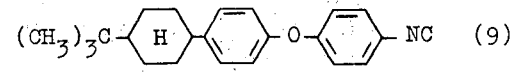 (9)

4'-(4-tert.-Butylcyclohexyl)-4-isocyano-diphenyl ether 105 g of 4'-(4-tert.-butylcyclohexyl)-4-formylamino-diphenyl ether were dissolved in 500 ml of methylene chloride and 105 ml of triethylamine. 30 g of phosgene were passed in at 0°–5°C, while stirring. After 15 minutes, the reaction mixture was washed with saturated sodium bicarbonate solution, dried over potassium carbonate and concentrated in vacuo at 30°C bath temperature.

Yield: 50g (50% of theory) of an oil.
IR spectrum: 2,110 cm$^{-1}$ (isonitrile group).

EXAMPLE 16

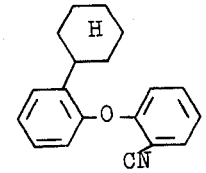 (10)

2-Cyclohexyl-2'-isocyano-diphenyl ether 147 g (0.5 mole) of 2-cyclohexyl-2'-formylamino-diphenyl ether were dissolved in 500 ml of ethylene chloride. After adding 101 g (1.0 mole) of triethylamine, 44.5 g (0.5 mole) (32 ml) were passed as a gas into the mixture. The reaction kept at 10°–20°C by external cooling. Thereafter the mixture was poured into sodium carbonate solution and was repeatedly washed with water. After drying over sodium sulfate and concentrating, 135 g of a dark oil were obtained. Boiling over activated charcoal in hexane caused a lightening of the color but standing in air again caused a dark discoloration. A 20 g sample was chromatographed over silica gel (Merck, 0.05–0.2 mm), using hexane/acetone (10:1). 16 g of a light-colored oil were thereby obtained (dark discoloration on a standing in air).

The IR spectrum shows a band at 2,125 cm$^{-1}$ which is characteristic of the isonitrile group.

It will be appreciated that the instant specification and examples are set forth by way of illustration and not limitation, and that various modifications and changes may be made without departing from the spirit and scope of the present invention.

What is claimed is:
1. An isocyanodiphenyl ether of the formula

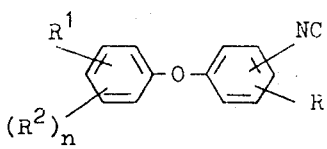

in which
R is hydrogen or halogen,
R¹ is cycloalkyl, alkyl substituted cycloalkyl, halogen or alkylmercapto,
R² is hydrogen, halogen or methyl, and
n is 1, 2 or 3.

2. A compound according to claim 1 in which R is chlorine, R¹ is cycloalkyl with 5 or 6 carbon atoms, chlorine, bromine, methylmercapto or ethylmercapto, and R² is hydrogen, chlorine, bromine or methyl.

3. The compound according to claim 1 wherein such compound is 4'-isocyano-4-cyclohexyl-2-methyl-diphenyl ether of the formula

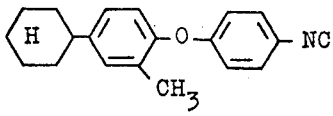

4. The compound according to claim 1 wherein such compound is 4'-isocyano-4-cyclohexyl-2-chloro-diphenyl ether of the formula

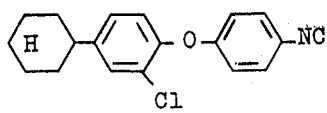

5. The compound according to claim 1 wherein such compound is 4'-isocyano-4-cyclohexyl-diphenyl ether of the formula

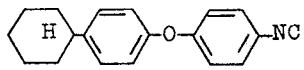

6. The compound according to claim 1 wherein such compound is 4'-isocyano-2-cyclohexyl-diphenyl ether of the formula

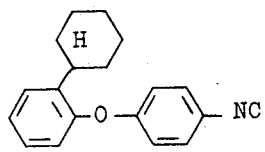

7. The compound according to claim 1 wherein such compound is 4'-(4-tert.-butylcyclohexyl)-4-isocyano-diphenyl ether of the formula

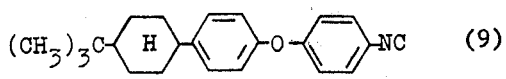

* * * * *